United States Patent [19]

Tada et al.

[11] Patent Number: 4,919,521
[45] Date of Patent: Apr. 24, 1990

[54] ELECTROMAGNETIC DEVICE

[75] Inventors: Hiroaki Tada, Nishinomiya; Harunobu Yoshida, Amagasaki; Hideo Kawahara, Mino; Kunio Miyata, Nishinomiya, all of Japan

[73] Assignee: Nippon Sheet Glass Co., Ltd., Osaka, Japan

[21] Appl. No.: 203,797

[22] Filed: Jun. 2, 1988

[30] Foreign Application Priority Data

| Jun. 3, 1987 | [JP] | Japan | 62-139450 |
| Aug. 4, 1987 | [JP] | Japan | 62-195061 |
| Aug. 28, 1987 | [JP] | Japan | 62-214643 |
| Nov. 11, 1987 | [JP] | Japan | 62-284990 |

[51] Int. Cl.$^5$ ............................................. G02F 1/01
[52] U.S. Cl. .................................................. 350/362
[58] Field of Search ............... 350/362, 334, 374, 353, 350/355

[56] References Cited

U.S. PATENT DOCUMENTS

| 3,257,903 | 6/1966 | Marks | 350/370 |
| 4,126,854 | 11/1978 | Sheridan | 350/362 X |
| 4,131,334 | 12/1978 | Witte et al. | 350/370 |
| 4,298,448 | 11/1981 | Muller et al. | 350/355 X |
| 4,345,820 | 8/1982 | Chabrolle | 350/362 |
| 4,407,565 | 10/1983 | Saxe | 350/374 |
| 4,435,047 | 3/1984 | Fergason | 350/334 |
| 4,442,019 | 4/1984 | Marks | 350/267 X |
| 4,657,349 | 4/1987 | Labes et al. | 350/362 |
| 4,663,083 | 5/1987 | Marks | 350/362 X |
| 4,680,103 | 7/1987 | Solomon et al. | 350/362 X |

FOREIGN PATENT DOCUMENTS

| 1124678 | 8/1968 | United Kingdom | 350/362 |
| 1586123 | 5/1977 | United Kingdom . | |

OTHER PUBLICATIONS

"Electrooptical Characteristics of Dipole Suspensions", Alvin M. Marks, Jul., 1969, vol. 8, No. 7, Applied Optics, pp. 1397-1412.

"Heat Mirror Coatings for Energy Conserving Windows", Carl M. Lampert, Solar Energy Materials 6, (1981), pp. 1-41.

Primary Examiner—Eugene R. LaRoche
Assistant Examiner—Nathan W. McCutcheon
Attorney, Agent, or Firm—Armstrong, Nikaido, Marmelstein, Kubovcik & Murray

[57] ABSTRACT

An electromagnetic device comprising solid matrix layer, wherein micro-capsules containing suspension anisotropic particles are dispersed, and a means for applying electric field or magnetic field to the anisotropic particles. According to the present invention, not only range of transmittance of solar radiation can be much improved, but also a smart window of large scale having nonuniformity of thickness and nonuniformity of density of particles can be realized.

4 Claims, 5 Drawing Sheets

ELECTROMAGNETIC DEVICE

BACKGROUND OF THE INVENTION

The present invention relates to an electromagnetic device using a solid matrix layer wherein micro-capsules each containing suspension of anisotropic particles are dispersed, and more particularly to an electromagnetic device of large area applicable to a cell with the controllability of transmission, so-called smart window, permeation-type indication element. Reflection-type indication element and the like used for architecture and vehicles, wherein the transmittance or reflection of solar radiation of device are electrically controlled.

As a device using micro-capsules, there has been known a liquid crystal comprising micro-capsuled nematic liquid crystal (hereafter refereed to as NCAP). Further, it is considered that an electrochromic element (hereafter referred to as EC element) is useful for the smart window which enables to lessen the load of air-conditioner by electrically controlling the transmittance of solar radiation (hereafter referred to as $T_G$) since the EC element changes the $T_G$ by electrochemical oxidation-reduction reaction of the electrochromic films (C. M. Lampert, Solar Energy Mater, 6 (1981) 1). In addition, as an element having controllability of the transmittance in the visible region, there has been provided by A. M. Marks an electromagnetic device comprising a suspension containing particles such as vanadium pentaoxide and lead carbonate, and electrodes sandwiching the suspension (hereafter referred to as DPS element) (U.S. Pat. No. 3,257,903 (1966)).

After that, the research of DPS elements has been performed and advanced by the group of Research Frontiers Inc.. The group reported that particles of hydrogenated herapathit were adaptable to DPS elements (U.S. Pat. No. 4,131,334(1977)).

NACP has a great advantage that a device having large area can be fabricated with maintaining high response rate of liquid crystal. In optical point of view, however, NACP has only switching function between transparent and milky (light scattering) states. Thus, NACP is applicable to a curtainless window and the like, but it is not applicable to the smart window requiring continuous control of $T_G$. To the contrary, the EC element has controllability of transmission, but it has such disadvantage as its response speed becomes remarkably slow and uniform light control cannot be obtained when the area becomes large, since its controllability of transmission depends on electric current.

Further, the DPS element is liquid, so that it has optical nonuniformity caused by partial nonuniformity of thickness and particle density. The nonuniformity of thickness is caused by the falling of liquid due to the gravity when the DPS element is arranged in a vertical state assuming its use for windows. The nonuniformity of particle density in a vertical direction is caused by sedimentation of anisotropic particles (generally made of metal or metal oxide) due to the difference of specific gravity between the anisotropic particle and solvent. Further, it is difficult for DPS elements with the above-mentioned disadvantages to be applied to a smart window having a large area, since the nonuniformity of thickness and particle density are promoted with the increase of area of the element.

Still further, the conventional DPS elements hardly have the ability of absorbing and reflecting light of visible and near infrared region. The absorbed and reflected wavelength band is narrow even if such light is absorbed or reflected. As a result, the conventional DPS element is suitable only for curtainless windows, but not suitable enough for smart window because of the lack of controllability of $T_G$.

To the contrary, the DPS element using hydrogenated herapathit has a good controllability of transmission, since it has strong light-absorbing ability for visible region. For the use of the window glass, however, DPS element has a problem in weatherproof ability since hydrogenated herapathit is organic compound.

It is accordingly an object of the present invention to solve the above-mentioned problem, i.e., to provide an electromagnetic device comprising solids or semisolids wherein micro-capsuled anisotropic particle suspension is contained, and a means for applying electric field or magnetic field to the anisotropic particles.

SUMMARY OF THE INVENTION

An electromagnetic device comprising solid matrix layer, wherein micro-capsuled suspension of anisotropic particles are contained, and a means for applying electric field or magnetic field to the anisotropic particles.

According to the present invention, as described hereinabove, not only the range of the control of transmittance of solar radiation can be much improved, but also a smart window of large scale can be realized by means of micro-capsuling, whereby nonuniformity of thickness between substrates, and nonuniformity of density of particles can be solved.

Further, the rate of orientation of particles remains high, so that the particles can be applied to transmissive device and reflective device of indicating.

In a preferred embodiment of the present invention, the electrodes of the electromagnetic means comprise a pair of electrodes at least one of which being a transparent electrode.

In another preferred embodiment of the present invention, a surface of the anisotropic particles is made of metal, metal oxide or organometal compound each having absorbing or reflecting ability for light of visible and near infrared region in order to improve the controllability of $T_G$. It is preferable to select metal or alloy from the group consisting of Pt, Pd, Au, Ag and Rh. For organometal compound, a mixed valence complex defined by the general formula of $M_{1x}[M_2(CN)_6]_y$, wherein $M_1$ and $M_2$ are transition metal, and x and y satisfy the relationships of $3 \leq x \leq 4$ and $2 \leq y \leq 3$ respectively. In the above embodiment, it is preferable that the metal or organometal compound is deposited on the anisotropic particles by the photodeposition method.

Further, it is preferable that metal oxide is tungsten bronze. The tungsten bronze is deposited on the anisotropic particles by immersing anisotropic particles into an electrolytically reduced acid solution containing therein tungsten acid ions and aliphatic carboxylic acid ions.

In still another preferred embodiment of the present invention, the surface of the anisotropic particles is covered with $Ti_nO_{2n-1}$ where n satisfies the relationship of $1 \leq n \leq 2$, preferably $Ti_nO_{2n-1}$ is stabilized by the doping with a very small amount of nitrogen.

DETAILED DESCRIPTION

Referring now to the drawing for more complete understanding of the present invention, there is explained an electromagnetic device.

Figure 1:
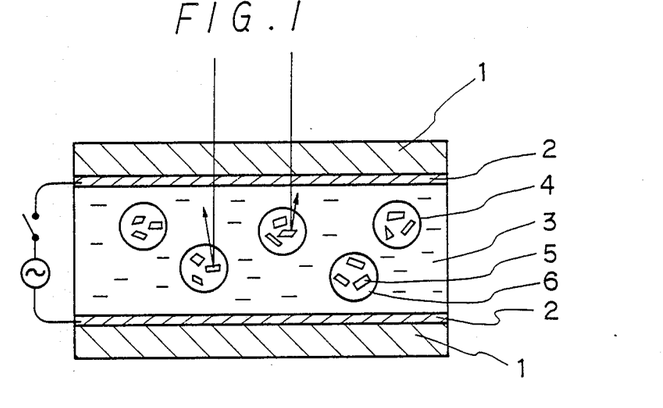
FIG. 1 and FIG. 2 show schematic illustrations of an embodiment of an electromagnetic device of the present invention at closed and open conditions respectively.
Figure 2:
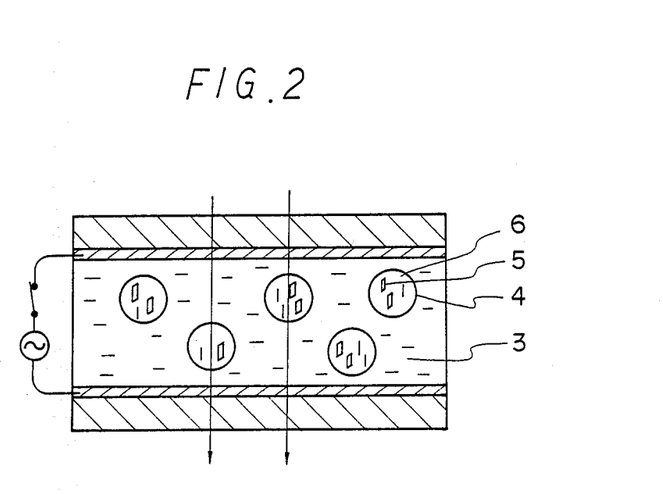

FIG. 1 and FIG. 2 show schematic illustrations of an electromagnetic device of an embodiment of the present invention at closed and open conditions respectively. In the drawings, numeral 1 indicates a glass substrate, numeral 2 indicates a transparent electrode, numeral 3 indicates a solid of semisolid layer, numeral 4 indicates a micro-capsule, numeral 5 indicates a suspension, and numeral 6 indicates a dispersing solvent.

In the present invention, it is preferable as an anisotropic particle to employ needle like or planar particles having electrical and magnetical anisotropy. In the case of applying anisotropic particles to the smart window, it is crucial to use such particles as having strong absorbing and reflecting ability for visible and near infrared region. Among parameters of particles having influence on the properties of the optical device, the ratio of longitudinal axis to diameter (hereafter referred to as a) for needle like particles is particularly significant, and the ratio of flat area to sectional area (hereafter referred to as a') for planar particles is particularly significant. Contrast between coloring and bleaching state is expressed by electrodichroic ratio (formula (1)).

$$grz = Dr/Dz \qquad (1)$$

where

Dr: optical density at a random orientation state
Dz: optical density at an aligned state by electric field or magnetic field.

Between grz and a there exists a relationship represented by formula (2). The contrast increases with the increase of a and a'.

$$grz \infty a^3 \qquad (2)$$

Further, a affects wavelength band causing spectra change, and the wavelength band decreases with the increase of a.

It is preferable for cell with the controllability of transmission that anisotropic particles have wide wavelength band where spectrum change occurs.

Thus, a suitable range of a is determined in terms of the considerations of the magnitude of transmittance change and the width of the band where spectrum change occur. Preferable range of a is from 10 to 50. The rate and degree of orientation of anisotropic particles increase with the increase of strength of electric or magnetic field. Therefore, it is necessary to make the thickness of the solid or semisolid matrix as thin as possible under low strength of electric or magnetic field. It is preferable that anisotropic particles are controlled under low voltage in order to extend the life of the device. Actually, it is difficult to make the matrix layer of 50 μm because of the restriction of flatness of electrode. Further, it is preferable that the diameter of micro-capsules dispersed in the matrix polymer is as small as possible in order to generate optically uniform change of color. From a practical point of view, it is preferable that the diameter of micro-capsules is not more than 25 μm, particularly not more than 5 μm.

Examples of anisotropic particles employable in the present invention are, for instance, (1) Organic compounds particles such as haloalkaloid acid salt represented by helapathit (iodoquinine sulfate), deflection metal halide, deflection metal perhalide, nafoxidine hydrochloride and guanine, (2) Inorganic compound grains such as basic carbonate lead, oxychloride bismuth, lead hydrogenarsenate, lead hydrogenphosphate, graphite, mica and garnet, (3) Metal and metal oxide particles such as aluminium, chromium, gold, palladium, silver, tantalum, titanium, tin oxide, titanium oxide and vanadium pentoxide, and (4) Particles covered with above-mentioned metal or metal oxide such as mica and glass flake.

Further, as a result of vigorous investigation, we inventors have found out that anisotropic particles having strong light-absorbing and light-reflecting ability for visible and near infrared region such as needle like or planer metal, organometal such as hexacyano complex, tungsten bronze, $Ti_nO_{2n-1}$ ($1 \leq n \leq 2$), and anisotropic particles at least coated with the above-mentioned material were particularly useful to improve the controllability of $T_G$ of DPS element.

Diversity, refractive index, decomposition voltage, fluid point, boiling point, viscosity and the like are taken into consideration on selecting the kind of solvent.

First, it is required of solvent that it disperses anisotropic particles uniformly and suspends the particles stably. In order to satisfy the above requirements, at least the specific gravity of solvent is near to that of anisotropic particle as much as possible.

Second, in order to improve the maximum value of transmittance of solar radiation on application of voltage, i.e., when anisotropic particles are aligned, solvent should be so selected as to make refractive index of anisotropic particles at alignment condition equals to that of the solid matrix.

Third, in order to extend the life of electromagnetic device, it is necessary to select such solvent as having high decomposition voltage. Further in order to make effective electric field in the micro-capsule, it is preferable to use high-purified solvent including ionizable impurity as less as possible. In consideration of the application for the smart window, it is desired that fluid point is under minus 20° C., and that boiling point is over plus 80° C. Further, it is desired that viscosity of solvent is low since open-shut speed, particularly open-to-shut speed, of smart window depends on Brownian motion of the particles. Concrete example of solvent is, for instance, polydimethylsiloxane. As the materials of the micro-capsules wherein the suspension are dispersed, are polymeric materials such as polyester, polyamide, polyurethane, polyurea, polyvinyl alcohol, gelatin and epoxy resin, and inorganic materials such as silica, magnesium silicate, calcium silicate, strontium silicate and barium silicate.

On selecting the dispersing solvent, it is preferable that refractive index of suspension containing the anisotropic particles and swelling of the matrix are taken into consideration, and that a suitable combination thereof is used for the smart window.

For micro-capsuling method, interfacial polymerization, IN SITU polymerization, direct dispersing method, coacervation method and the like can be adopted when anisotropic particles are made of polymeric materials. Further, micro-capsuling can be carried out by the following method:

(1) To make a mixture of suspension containing anisotropic particles, substance involving micro-capsules and carrying medium forming latex.
(2) To apply the mixture onto a substrate.
(3) To remove only the carrying medium by drying.

Still further, micro-capsuling can also be carried out the following simplified method referred to as direct dispersing method:

(1) To add the suspension into a solution of polymeric material before the hardening.
(2) To stir the solution strongly to change the solution into emulsion.
(3) To harden the emulsion by heating, UV radiation and the like.

In the direct dispersing method, matrix polymer itself becomes substance of micro-capsules. Alternately, interfacial reaction method can be adopted when substance involving micro-capsules is inorganic material.

For the application to electro-optical device, the matrix layer involving the encapsulated suspension is sandwiched between a pair of electrodes at least one of which is a transparent electrode. Low electric resistance and high transmittance are required for the transparent electrode. From this point of view, ITO, $SnO_2$, and ZnO can be preferably used. Further, when the electro-optical device are required to have strong shielding effect of light for near infrared region, semi-transprent film of metal such as aluminium, platinum, gold, silver, copper and stainless steel, or semitransparent film of alloy thereof can be used as a transparent electrode.

The following materials can be used for electrode-supporting substrate, i.e., glass, plastics and transparent ceramics can be adopted for the smart window of architecture, and plastics which is suitable for bending can be adopted for the smart window of vehicle. Further, a reflecting indication device can be made by applying metal to one side of electrodes or substrate side.

The size of the anisotropic particles used in the present invention is different from that of ordinary liquid crystal. The size of the anisotropic particles used in the present invention which are made of inorganic material or organometal is between about 20-30 nm and about 20-30 μm. Thus, the anisotropic particles have more shielding effect of light caused by light absorbing and reflecting ability depending on the shape factor than the ordinary liquid crystal. The shielding effect of light by reflecting causes energy reflecting effect when the device using above-mentioned anisotropic particles are applied to windows, so that the load of cooling is lowered.

Referring now to an embodiment of the electromagnetic device of the present invention, comprising solid matrix layer containing encapsulated suspension of anisotropic particles and a pair of electrodes which sandwiches the solid matrix layer, there is explained an operation of the present invention.

As shown in FIG. 1, when voltage is not applied between the electrodes, anisotropic particles contained in micro capsules are in a random orientation state, so that light is strongly absorbed or reflected by the anisotropic particles. By the application of voltage under suitable conditions, the anisotropic particles are orientated as follows:

(1) The anisotropic particles, each having a needle like shape, are orientated in the way in which the major axes of anisotropic particles is parallel to the electric field.
(2) The anisotropic particle, each having a planar shape, are orientated in the way in which planar faces of anisotropic particles is parallel to the electric field.

In result, the area having light absorbing or reflecting ability in the electromagnetic device is heavily lessened, and interaction between electric vector of polarized light and anisotropic particles is minimized, so that most of the light can be transmitted.

In a preferred embodiment of the present invention, one of the electrodes of the electromagnetic means comprises a pair of electrodes at least one of which being a transparent electrode.

In another preferred embodiment of the present invention, a surface of the anisotropic particles is made of metal, metal oxide or organometal compound each having absorbing or reflecting ability for light of visible and near infrared region in order to improve the controllability of transmission. It is preferable to select metal or alloy from the group consisting of Pt, Pd, Au, Ag and Rh. For organometal compound, a mixed valence complex defined by the general formula of $M_{1x}[M_2(CN)_6]_y$, wherein $M_1$ and $M_2$ are transition metal, and x and y satisfy the relationships of $3 \leq n \leq 4$ and $2 \leq y \leq 3$ respectively. In the above embodiment, it is preferable that the metal or organometal compound is deposited on the anisotropic particles by photodeposition method.

Further, it is preferable that metal oxide is tungsten bronze. The tungsten bronze is deposited on the anisotropic particles by dipping anisotropic particles into electrolytically reduced acid solution of tungsten acid ions and aliphatic carboxylic acid ions.

Next there is explained a electromagnetic device of the present invention based on Examples. The scope of the present invention is not, however, limited to the examples.

EXAMPLE 1

0.1 g of planar pearl mica particles, of which length was about 3 μm and aspect ratio was about 20, were added to 1 g of silicon oil. The silicon oil was stirred enough to obtain uniform solution which showed glaze like pearl (hereafter referred to as solution A). 1.5 g of hexamethylenediisocyanate (HDI) was added to 10 g of trifunctional polyethylene glycol (3 PEG). The mixed solution was stirred enough to obtain uniform solution (hereafter referred to as solution B). 1 g of solution A was added to 10 g of solution B, and 0.5 weight % of tin octylic acid was added to them as catalyst, and then the solution was stirred heavily. The solution became emulsion which generated many micro-drops of silicon oil containing pearl mica. Micro-spherical spacers of 50 μm diameter were dispersed into the emulsive solution. The solution was spreaded on a glass substrate with transparent conductive film of $SnO_2$. The other electrode was put on the particle-suspend solution in such a manner that the solution was sandwiched between two glass substrates in order to make a cell. The 3 PEG and HDI was completely condensated by heating the cell at 80° C. for 30 minutes, so that a cell could be solidified. The solidified cell showed white glaze like pearl (closed condition shown in FIG. 1) when no-voltage way applied. When voltage (ex. AC 100 V and 60 Hz) was applied to the cell, the color of the solid cell changed to transparence (open condition shown in FIG. 2). Switching speed of solid cell was as follows:

(1) The time required from closing to opening state for a cell was from several milliseconds to several tens of milliseconds.

(2) The time required from opening to closing state was several seconds.

There were no differences of properties of device after repeating the switching operations for several times. Thus, it was proved that the change of condition for closing and opening state was reversible.

The above example was an electro-optical device which can be controlled by electric field. Alternately, a magnet-optical device, which is controlled by magnetic field, can also be fabricated in the same manner.

EXAMPLE 2

A smart window of capsule type was fabricated by the same method as described above, wherein the size of the window was 1 m×1 m. A smart window of non-capsule type was fabricated by sandwiching particle suspension comprising the same material and having the same density between glass substrates each coated with transparent conductive film, wherein the size of the window was 1 m×1 m.

The two smart windows were arranged vertically for one month. The absorbance for light was measured at bottom and top of window for 400 nm wavelength light. The result of ratio of absorbance (bottom/top) is summarized in Table 1.

TABLE 1

| Type | Ratio of absorbance for light (bottom/top) |
|---|---|
| capsule type | 1.004 |
| non-capsule type | ∞ | where ∞ means that all particles suspended in the solution were sedimented.

The nonuniformity of density for particles in the solution in vertical condition can be caused by falling the particles due to the gravity. From the result of table 1, the above problem for nonuniformity is almost solved by the smart window of capsule type.

EXAMPLE 3

100 mg of planar mica particles covered with $TiO_2$ (hereafter referred to as TOM), of which length was about 3 μm and aspect ratio was about 20, was added to 5 g of 1 wt % aqueous solution of silver nitrate. The solution was stirred enough to obtain suspension. The suspension was poured into a test tube and argon was bubbled in it for 15 min. Thereafter, the tests tube was shield. Five samples were prepared.

The samples were stirred by a stirrer under radiation from light source of 400 W high voltage mercury-lamp. The radiation time was changed one another as shown in Table 2.

The particles in the solution were separated centrifugally to all samples, and the particles contained in each samples were cleaned enough with distilled water. Then the particles were dryed by heating at 120° C. for 20 hours.

Amount of silver deposited on TOM was analyzed by ICP method. The result is summarized in Table 2.

TABLE 2

| Sample No. | Radiation time (hour(s)) | Ag Contents (weight %) |
|---|---|---|
| 1 | 0.5 | 0.4 |
| 2 | 2 | 0.68 |
| 3 | 3 | 2.18 |
| 4 | 4 | 3.71 |
| 5 | 5 | 9.8 |

Two samples were made for comparing with the characteristics for TOM particles with and without silver deposition as follows. 50 mg of TOM particles with silver deposition and 50 mg of TOM particles with no silver deposition were added to 0.5 g of a solution of polydimethylcyclohexane respectively. Then each solutions were stirred enough to make uniform suspension.

A very small amount of beads of 25 μm in mean diameter, as a spacer, were dispersed into the suspension. The suspension were sandwiched between two glass substrates having a sheet resistance of 20 Ω/□ coated with transparent conductive film to fabricate a cell.

Transmittance of solar radiation (hereafter referred to as $T_G$) of the sandwich cells were measured before and after applying the voltage of AC 40 V and 60 Hz. The differences of transmittance before and after applying the voltage (hereinafter referred to as $\Delta T_G$) were calculated.

Figure 3:
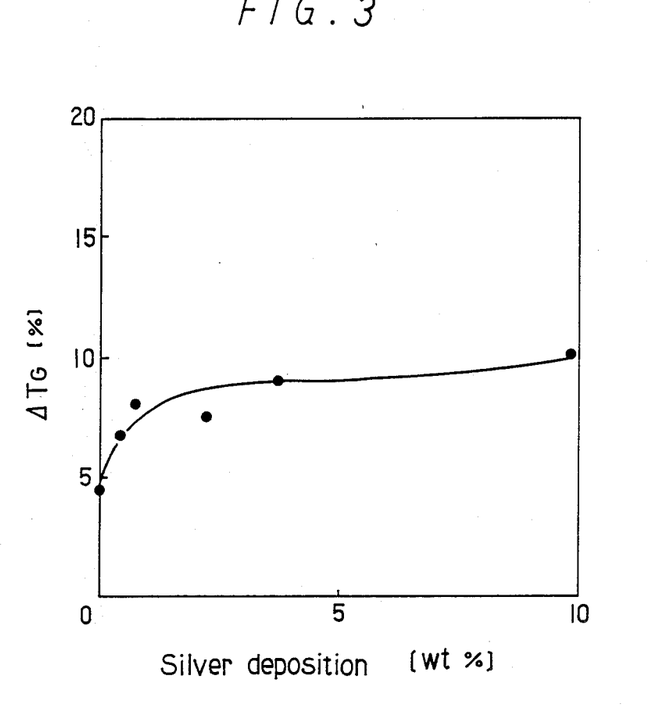
FIG. 3, FIG. 4, FIG. 5 and FIG. 6 show characteristic diagrams of an electromagnetic device of the present invention.

FIG. 3 shows the results of $\Delta T_G$ (%) for each cells wherein five cells had different amount of silver deposition on TOM and one cell had no silver deposition on TOM. An abscissa is the amount of silver deposition on TOM (weight %), and an ordinate is $\Delta T_G$ (%).ABS are measured values of $\Delta T_G$.

From FIG. 3, $\Delta T_G$ increases with the increase in the amount of silver deposition, and the value of $\Delta T_G$ for 9.8 weight % of silver deposition shows 2.3 times larger than that of the sample with no silver deposition. Color tone was white for TOM only, and the tone changed from gray to black-gray with the increase of the amount of silver deposition.

EXAMPLE 4

Potassium tungstate, oxalic acid were added into the water to obtain 500 ml solution having a pH value of 2. The added amount of potassium tungstate and oxalic acid was 0.05 and 0.075 mol $dm^{-3}$ respectively. The ratio of concentration of oxalic acid to potassium tungstate is 1.5. The solution was kept at 70° C. While sufficiently stirring the solution, the solution was electrolytically reduced for 4 hours by applying voltage with current density of 0.5 A/$dm^2$ between a pair of electrodes dipped therein, wherein the surface area of cathode was 60 $cm^2$. The color tone of solution changed from achromatic transparency to blue green.

10 ml of the above solution was poured into three test tubes respectively. Then 200 mg of TOM was added to them. The solutions with TOM were kept being stirred at 15° C. for prescribed period of time as shown in Table 3. Thereafter, TOM was centrifugally separated from each solutions, and separated TOM were purified with distilled water. They were dryed in vacuum for more than 20 hours at 50° C. The weight of tungsten bronze deposited on TOM was measured by ICP method. The result is summarized in Table 3.

TABLE 3

| Sample No. | Stirring time (hour(s)) | Tungsten bronze (weight %) |
|---|---|---|
| 6 | 1 | 7.6 |

TABLE 3-continued

| Sample No. | Stirring time (hour(s)) | Tungsten bronze (weight %) |
|---|---|---|
| 7 | 2 | 10.4 |
| 8 | 3 | 14.1 |

Next, 50 mg of fully dried TOM covered with tungsten bronze were added to 0.5 g of solution of polydimethylcyclohexane. The solution was stirred to obtain uniform suspension. A very small amount of beads having a mean diameter of 25 μm, as a spacer, were dispersed into the suspension. Then the suspension was sandwiched between two glass substrates, having a sheet resistance of 20 Ω/□ coated with transparent conductive film to fabricate a cell.

$T_G$ of sandwich cells were measured before and after applying voltage of AC 40 V and 60 Hz. $\Delta T_G$ were calculated based on the measured values.

Figure 4:
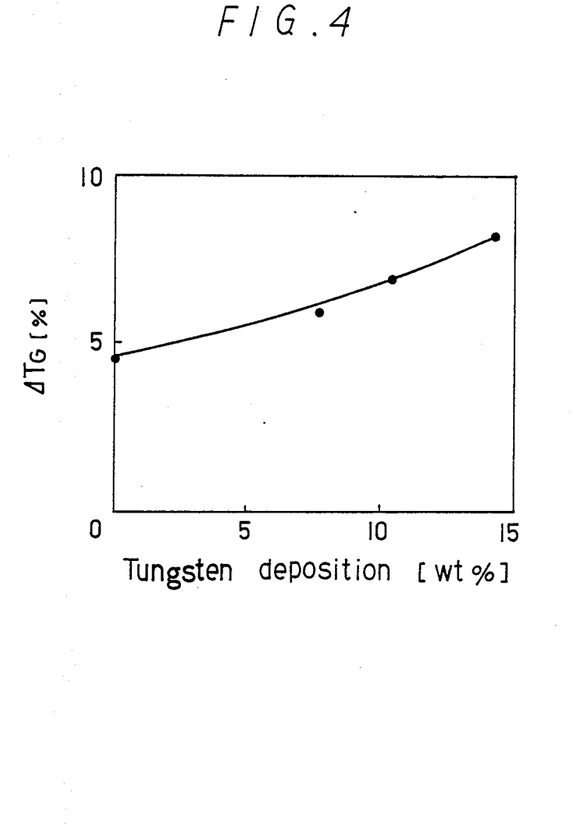

FIG. 4 shows $\Delta T_G$ (%) for cells having different amount of tungsten bronze deposition on TOM. In FIG. 4, an abscissa is the amount of tungsten bronze deposition (weight %) on TOM, an ordinate is $\Delta T_G$ (%), and dots show measured values of $\Delta T_G$. In FIG. 4, the value of $\Delta T_G$ for W=0 is substituted by value for TOM proposed by B. D. Bostwich et al (Japanese Unexamined Patent Publication No. 69308/1986.) It can be understood from FIG. 4 that $\Delta T_G$ increases with the increase in the amount of tungsten bronze deposition, and that $\Delta T_G$ for 14.1 weight % of tungsten bronze is 1.8 times larger than that of a sample with no tungsten bronze deposition.

EXAMPLE 5

200 mg TOM were reduced at 800° C. for 5 hours under nitrogen atmosphere with small amount of ammonia. After reduction, color of the TOM particle changed from white to black. The reduced black particles (TiO) were dispersed into polydimethylcyclohexane (PSO) to prepare four different suspensions. The weight ratio of TiO to PSO (TiO/PSO) are shown in Table 4.

TABLE 4

| Sample No. | TiO/PSO (weight %/weight %) |
|---|---|
| 9 | 1% |
| 10 | 2% |
| 11 | 10% |
| 12 | 15% |

A very small amount of beads having a mean diameter of 25 μm were dispersed into the suspension. Then the suspension was sandwiched between two glass substrates, having a sheet resistance of 20 Ω/□, coated with transparent conductive to fabricate cells.

$T_G$ of cells were measured before and after applying voltage of AC 40 V and 60 Hz. $\Delta T_G$ were calculated based on the measured values.

Figure 5:
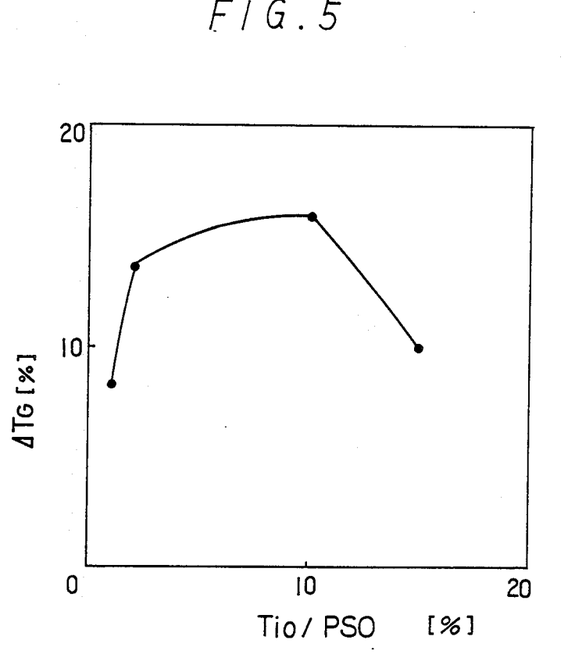

FIG. 5 shows the results of $T_G$ (%) for cells with different weight ratio of TiO/PSO. In FIG. 5, an abscissa is the ratio of TiO/PSO (%), an ordinate is $\Delta T_G$ (%), and dots show measured values of $\Delta T_G$. $\Delta T_G$ increases with the increase in weight ratio of TiO/PSO till the ratio of TiO/PSO becomes 10%. However, when the ratio exceeds 10%, $\Delta T_G$ decreases. The maximum value of $\Delta T_G$ is 16% when TiO/PSO is equal to 10%.

For TOM proposed by B. D. Bostwick et al, $\Delta T_G$ was about 4.5%. By reducing TOM, $\Delta T_G$ reached about 3.6 times larger than that of no-reduced TOM.

Figure 6:
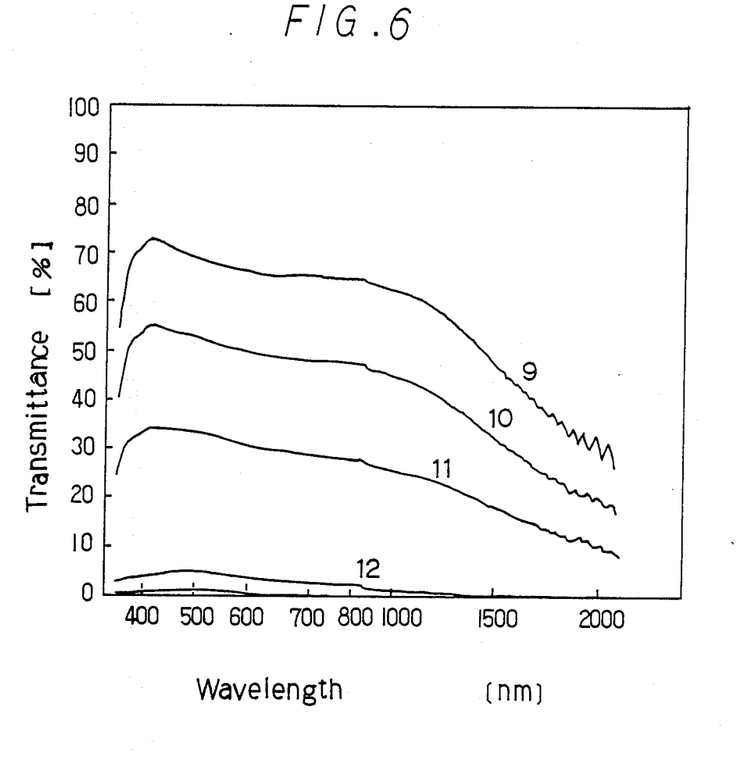

FIG. 6 shows the spectra of transmittance from visible to near infrared region for samples 9 to 12. the transmittance in all region decreases with the increase in the density of particles. From this, TiO particle shows prominent absorbing ability for spectra of visible and near infrared region. Thus, it can be concluded that TiO particle might be the most suitable material for smart window.

According to the present invention, not only range of transmittance of solar radiation can be much improved, but also a smart window of large scale can be realized by means of micro-capsuling, whereby nonuniformity of thickness between substrates, and nonuniformity of density of particles can be solved.

In this device, the time required for changing the direction of particles is short, so that the present invention can be also applied to transmittable device and reflective device and the like.

What is claimed is:

1. An electromagnetic device comprising:
   (a) a solid matrix layer;
   (b) micro-capsules containing a suspension of anisotropic particles being dispersed in the solid matrix layer;
   (c) a means for applying an electric field or a magnetic field to the anisotropic particles, said means comprising a pair of electrodes, at least one of which is a transparent electrode; and
   (d) the surface of the anisotropic particles being made of a mixed valence complex represented by the general formula of $M_{1x}[M_2(CN)_6]_y$ wherein $M_1$ and $M_2$ are at least one transition metal, and x and y satisfy the relationship of $3 \leq x \leq 4$ and $2 \leq y \leq 3$ respectively.

2. An electromagnetic device comprising:
   (a) solid matrix layer;
   (b) micro-capsules containing a suspension of anisotropic particles being dispersed in the solid matrix layer;
   (c) a means for applying an electric field or a magnetic field to the anisotropic particles, said means comprising a pair of electrodes, at least one of which is a transparent electrode; and
   (d) the surface of the anisotropic particles being made of a tungsten bronze.

3. An electromagnetic device comprising:
   (a) a solid matrix layer;
   (b) micro-capsules containing a suspension of anisotropic particles being dispersed in the solid matrix layer;
   (c) a means for applying an electric field or a magnetic field to the anisotropic particles, said means comprising a pair of electrodes, at least one of which is a transparent electrode; and
   (d) the surface of the anisotropic particles being $Ti_nO_{2n-1}$ where n satisfies the relationship of $1 \leq n \leq 2$.

4. The electromagnetic device of claim 3, wherein the anisotropic particles of $Ti_nO_{2n-1}$, where n satisfies relationship of $1 \leq n \leq 2$, are stabilized by the doping with a very small amount of nitrogen.

* * * * *